United States Patent [19]
Paul et al.

[11] Patent Number: 5,383,378
[45] Date of Patent: Jan. 24, 1995

[54] DRIVEN AXLE

[75] Inventors: Michael Paul, Passau; Eberhard Wilks, Hutthurm; Bernd Mamerow, Hamburg, all of Germany

[73] Assignee: Zahnradfabrik Friedrichshafen AG, Germany

[21] Appl. No.: 39,422

[22] PCT Filed: Oct. 30, 1991

[86] PCT No.: PCT/EP91/02054
§ 371 Date: Apr. 22, 1993
§ 102(e) Date: Apr. 22, 1993

[87] PCT Pub. No.: WO92/08069
PCT Pub. Date: May 14, 1992

[30] Foreign Application Priority Data

Nov. 2, 1990 [DE] Germany ............... 4034884

[51] Int. Cl.⁶ .............................................. F16H 35/04
[52] U.S. Cl. ................................................... 74/650
[58] Field of Search ..................................... 74/650

[56] References Cited

U.S. PATENT DOCUMENTS

| | | | |
|---|---|---|---|
| 3,397,593 | 8/1968 | Knoblock | 74/650 |
| 4,498,355 | 2/1985 | Schou | 74/650 |
| 4,507,984 | 4/1985 | Goscenski, Jr. | 74/650 |
| 4,735,108 | 4/1988 | Teraoka et al. | 74/650 |
| 4,745,818 | 5/1988 | Edwards et al. | |
| 4,782,720 | 11/1988 | Teraoka et al. | 74/650 |
| 4,887,686 | 12/1989 | Takei et al. | |
| 4,949,594 | 8/1990 | Galhotra | 74/650 |
| 5,044,229 | 9/1991 | Visentini | 74/650 |

FOREIGN PATENT DOCUMENTS 0182312  5/1986  European Pat. Off.
0239763  10/1987  European Pat. Off.

Primary Examiner—John T. Kwon
Attorney, Agent, or Firm—Davis, Bujold & Streck

[57] ABSTRACT

Proposed are free-wheel clutches (12) for a driven axle of an all-wheel-drive vehicle in which the degree to which the steered wheels (17, 18) are connected to the drive (4) depends on the steering angle. A snap-in catch in the clutches (12), as well as a passive locking device (59, 60), are switched over automatically by the output shafts (13, 14), the output shafts being connected to the steered wheels (17, 18) by double crossed joints (15, 16).

5 Claims, 3 Drawing Sheets

DRIVEN AXLE

The invention concerns a driven axle having two output shafts coaxially supported in the axle housing, according to the invention.

BACKGROUND OF THE INVENTION

In a multi-track vehicle, if it travels around a curve, the wheels of one axle run over curved paths of different diameters. Since the turnable-outer wheels cover a longer path than the turnable-inner wheels, they have different speeds if no slippage occurs between the ground and the wheels. If the wheels are now driven together, precautions that permit suitably different speeds on the wheels without tensions resulting between the wheels themselves and in the drive train have to be taken. Differentials or clutches, which distribute or interrupt the drive to the wheels when cornering serve this purpose.

In EP-A 02 39 763 is described a driven axle for motor vehicles having two free-wheel clutches both of which transmit to the synchronously rotating wheezes the power of an engine when traveling straight ahead. During a travel condition with varying ground adherence of the wheels, such as with one wheel upon ice and the other wheel on gripping solid soil, the engine power, when the clutches are engaged, is transmitted to each wheel in proportion to the adhesion limiting value so that optimal traction values are obtained.

When cornering, a free-wheel clutch interrupts the drive to a wheel, especially to the turnable-outer wheel that runs more quickly during a traction operation. The free-wheel clutches, therefore, allow the separation of the wheels or rigid transmission function depending on the travel condition.

An expansion device contains a cylindrical bolt as a supporting element and annular pistons provided with cams. The annular pistons are rotatable relative to the supporting element. The supporting element firmly connected with the housing of the free-wheel clutches rotates during stress cycle in the drive relative to the annular pistons and pressurizes the annular pistons in an axial direction. If in the traction operation one of the wheels of the axle rotates more quickly than the opposite wheel, its annular piston rotates in advance relative to the supporting element in a drive direction so that the cams release themselves from the expansion device and the disengaged clutch interrupts the connection between drive and quicker wheel. Separately disposed cams are provided on the annular pistons for forward and reverse travel.

The rotation in the direction of travel of the annular piston of the clutch which leads to the quicker wheel has to be limited in a manner such that its cam surface remains free for the opposite direction of travel. Otherwise, the clutch could be engaged again by the cam surface for the opposite direction of travel and stresses result in the drive train.

In the above cited publication is described a clip which limits the torsion clearance of the annular pistons. When cornering, the clip holds the annular piston leading to the turnable-outer quicker wheel in a neutral position free of axial force as long as the supporting element with the opposite annular piston holds its clutch engaged and connects the turnable-inner wheel with the drive. For a stress-free operation, two driving modes are provided:

cornering with a leading wheel and a driven wheel of an axle, and straight-ahead travel.

Agricultural vehicles reach angles of lock of the steered wheel larger than 50 degrees. The turnable-inner and turnable-outer steered wheels of a front axle run from a specific steering angle larger than about 35 degrees, for instance, to curved paths larger than the curved path of the central rear axle. If the motor vehicle is all-wheel driven, the wheels of the steered front axle in the presence of an adequate transmission ratio between front and rear axles, are in a coasting operation away from the specific steering angle.

If one of the steered wheels is in a coasting operation, as result of its large path radius and remains, at the same time, rigidly connected with the drive, slippage occurs on this wheel and on the wheels still in a traction operation when there is an elevated load of the drive.

For stress-free operation of an all-wheel drive with a steering angle larger than a specific steering angle of about 35 degrees, for instance, both steered wheels of a driven front axle should therefore run freely in order to keep the drive free of additional stresses and to operate the motor vehicle with improved efficiency.

SUMMARY OF THE INVENTION

The problem to be solved by this invention is to provide a driven axle having two free-wheel clutches which from the traction operation automatically makes possible the free wheeling of both the turnable-inner and turnable-outer wheels lock in case of angles of larger than a specific steering angle of the steered wheels of an axle, separates the quicker turnable-outer wheel from the drive and connects the turnable-inner wheel with the drive in case of angles of lock smaller than a specific steering angle of the steered wheels, drives synchronously both wheels of an axle in case of straight-ahead travel.

According to the invention, this is obtained by the fact that when using the axle as a steered axle of an all-wheel driven vehicle, the expansion device, starting from a specific steering angle, is held in the neutral position with minimal expansion.

The annular pistons of the expansion device, from a specific steering angle larger than about 15 degrees, for instance, are held in power-free neutral position so that the clutches are disengaged. The annular piston for the turnable-outer wheel is held in the power-free neutral position already with small steering angles by the passive device and away from a specific steering angle both annular pistons are additionally held by a snap-in catch.

The annular piston for the turnable-inner wheel, in the transition from the traction to the coasting operation, rotates automatically in a direction of the power-free neutral position where it is retained firmly by the snap-in catch. This passive device is power free when the steering angles are larger than a specific steering angle and only when the steering angle is again smaller than the specific steering angle does the snap-in catch, dependent on the steering angle again disengage itself from the annular pistons and the passive device, which allows a limited torsion between the two annular pistons, determines their torsion.

According to the invention, the output shafts in a rigid axle are connected with steered wheels via double-crossed joints.

The wheels are pivotally secured to the rigid axle housing. With steering angle of the wheels, the double-crossed joints produce an axial movement of the output shafts. By virtue of this axial movement of the output shafts, dependent on the steering angle, a particularly precise, reliable and economic automatic actuation of the snap-in catch can be obtained. Away from a specific steering angle, the snap-in catch retains the expansion device in neutral position with minimal expansion.

According to the invention, the snap-in catch consists of two parts having each shift teeth. The turnable-outer annular piston, already with a small steering angle, reaches the power-free neutral position and the turnable-inner annular piston does it only away from a large steering angle. The steering angle produces on the turnable-inner wheel a swivel angle larger than on the turnable-outer wheel. The output shaft connected with the inner-turnable wheel, already with a small steering angle, presses the shift teeth of the snap-in catch in the annular piston of the clutch toward the turnable-outer wheel so that the annular piston is not held in the neutral position only by the passive device and can produce, from the expansion device, no engaging force on the clutch. Only from a specific steering angle of about 35 degrees, for instance, does the output shaft connected with the turnable-outer wheel press the shift teeth of the snap-in catch against the annular piston of the turnable-inner clutch so that the annular piston, when slipped along in the direction of rotation by the inner-turnable wheel passing to the coasting operation, is held by the snap-in catch in the passage through the neutral position. It is also obtained that the shift teeth actuated by the turnable-outer wheel with the small steering angle releases the turnable-inner annular piston before the turnable-outer annular piston when the steering angle diminishes, and the connection between turnable-inner wheel and drive is restored before the turnable-outer wheel is again connected with the drive.

According to the invention, it is obtained that the output shafts, for instance, with a steering angle in parking, can press the shift teeth without damage against the annular pistons when the shift teeth are no longer aligned with a groove in the annular piston.

According to the invention, it is obtained that the annular piston rotates without friction and consequently without hysteresis relative to the supporting disc.

According to the invention, an easy opening of the clutch is made possible by the rotatability of the external discs when the appertaining wheel should rotate more quickly than allowed by the drive.

According to the invention, the engagement of the shift teeth automatically disengages when the shift teeth are not pressed by the output shafts in grooves in the annular pistons.

According to the invention, the free-wheel clutches of the invention can also be manually changed over to a neutral position so that the wheels remain separated from the drive. The free-wheel clutches in one of several driven axles can replace a shiftable clutch between the axles. If the wheels are in a traction or a coasting operation, there is produced in a stress cycle a neutral position specified from outside.

The claims contain a logical combination of the solution features; other combinations are easily possible for a skilled person within the scope of the invention.

BRIEF DESCRIPTION OF THE DRAWINGS

In the drawings are shown embodiments of the invention.

DESCRIPTION OF THE PREFERRED EMBODIMENTS

Figure 1:
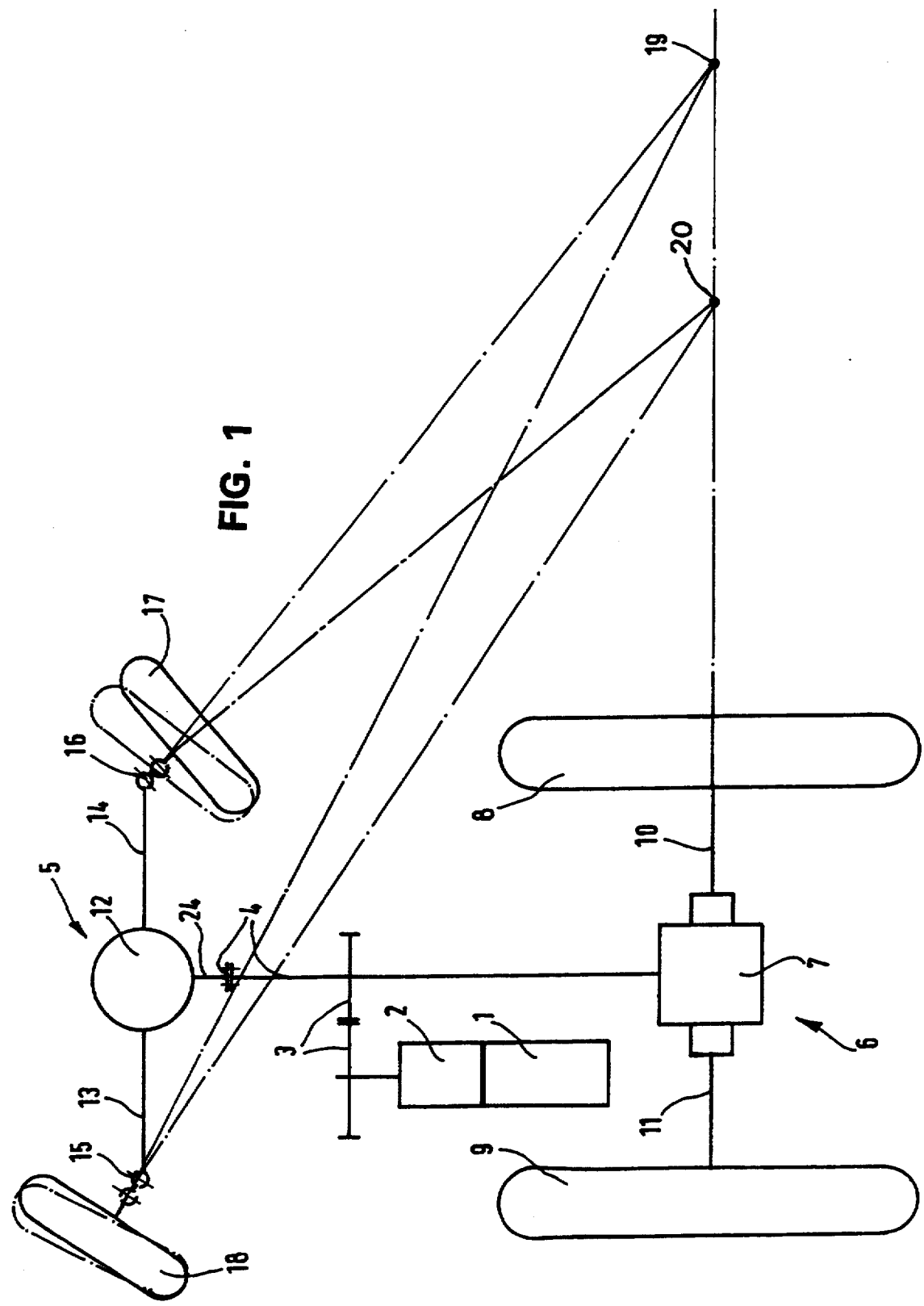
FIG. 1 a drive diagram of a 4-wheel motor vehicle,
FIG. 2 the free-wheel clutches according to the invention,
FIGS. 3A, 3B and 3C an operation diagram for supporting discs and annular pistons,
FIGS. 4/4a an active device for limiting the torsion of the locking elements of the annular pistons,
FIG. 5 a cross section of the annular piston according to the invention, and
FIG. 6 a passive device for limiting the torsion of the half shells of the annular pistons.

In FIG. 1 are shown the geometric ratios in the embodiment of two different steering angles for an all-wheel drive.

An internal combustion engine 1 drives, via a transmission 2, a pair of spur gears 3 and a central input shaft 4, a steered, rigid front axle 5 and a rigid rear axle 6, not steered. A bevel gear differential 7 connects the wheels 8, 9 of the rear axle with the central input shaft 4 via output shafts 10, 11. The front axle 5 contains free-wheel clutches 12, according to the invention, which connects the output shafts 13, 14 with the steered front wheels 17, 18 via double-crossed joints 15, 16. The thin broken line shows the front wheels with a small steering angle and the thick drawn line shows the front wheels with a large angle. The perpendicular lines upon the planes of the turnable-inner wheels and the turnable-outer wheels 17, 18 intersect the line of the rear axle 6 at an instantaneous center of rotation 19 or 20. Depending on the steering angle, the instantaneous center of rotation changes its distance to the center of the bevel gear differential 7 of the not steered rear axle and to the front wheels. The distance of the instantaneous center of rotation 19 from the turnable-outer wheel 18 and thus the path radius thereof is to each steering angle always greater than the distance from the instantaneous center of rotation 19 to the center of the rear axle 6 of the bevel gear differential 7. In case of a small steering angle, the radius path—the distance of the instantaneous center of rotation 19 from the turnable inner wheel 17—is smaller than that from the instantaneous center of rotation to the bevel gear differential 7 of the rear axle 6. With a large steering angle, the path radius—the distance of the instantaneous center of rotation 20 from the turnable-inner wheel 17—is greater than that from the instantaneous center of rotation to the bevel gear differential 7 of the rear axle 6. With a specific limiting angle, which is dependent on the path width and the wheel base and generally amounts to about 15 degrees, the distance of the instantaneous center of rotation 19 from the turnable-inner front wheel 17 is equal to that from the instantaneous center of rotation to the center of the bevel gear differential 7 of the rear axle 6. If the turnable-inner wheel 17 turns from a small steering angle to a steering angle larger than the specific limiting angle, then, under an adequate reduction ratio between the front and rear axles, the turnable-inner wheel 17 changes from a traction to a coasting operation and conversely from a coasting to a traction operation when returning from the larger to the smaller steering angle.

If the front wheels 17, 18 are already in a coasting operation, for instance, on a downhill run or when braking, no reversal from coasting to traction takes place when returning from the large to the small steering angle of the wheels 17, 18.

Figure 2:
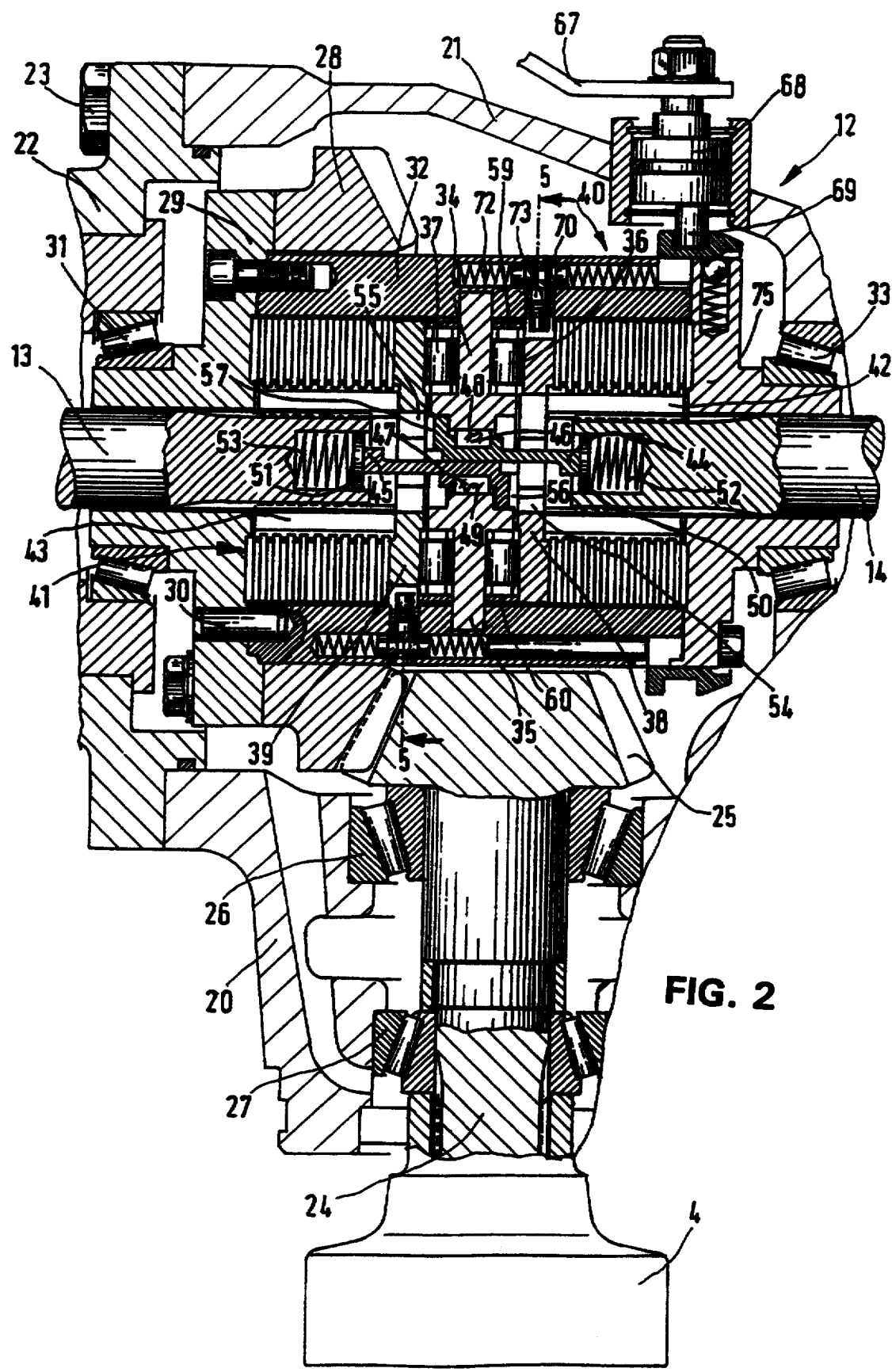

FIG. 2: A rigid axle housing consists of two axle bridges 21, 22 held together by screws 23. A shaft 24 is driven by the shaft 4. The shaft 24 is provided with a pinion 25 and rotatably supported with two tapered roller bearings 26, 27 in an axle drive housing 20. The axle drive housing 20 can be integral part of the axle bridge 21.

The pinion 25 is in contact with a gearing of a crown gear 28, which is screwed to a cover 29 of the housing 32 of the free-wheel clutches 12. The cylinder pins 30 act as protection against torsion between cover 29 and the housing 32. The housing cover 29 is held by a tapered roller bearing 31 in the axle bridge 22. The housing 32 of the free-wheel clutches 12 is supported in the axle bridge 21 via another tapered roller bearing 33. The housing cover 29 is screwed to the housing 32 of the free-wheel clutches 12. The output shaft 13 and the output shaft 14 are rotatably supported, respectively, in the housing cover 29 and in the housing 75.

The supporting disc 34 is non-torsionally held by means of studs 35 in the housing 32 of the free-wheel clutch 12.

The free-wheel clutches 12 contain two disc sets 40, 41. The annular pistons 38, 39 are rotatable in relation to the supporting disc 34 of the free-wheel clutches 12 and abut against internal discs of the disc clutches 40, 41. The internal discs are non-torsionally mounted on internal disc carriers 42, 43 which are non-torsionally mounted with the output shafts 13, 14. External discs 77 of the disc clutches 40, 41 of the free-wheel clutches 12 are rotatably held in the housing 32 of the free-wheel clutch 12 at an angle of about 30 degrees, for instance.

Figure 3A:
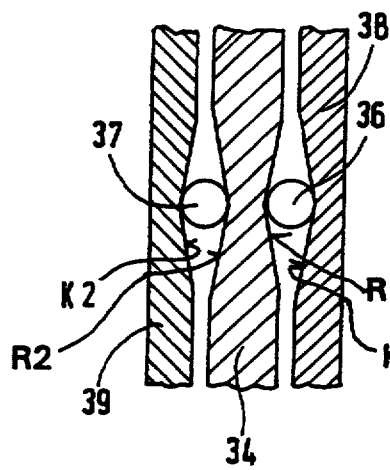

FIG. 3A: The supporting disc 34 contains cam surfaces R1, R2. Power-transmission elements 36, 37 such as rollers are situated coaxially with respect to both sides of the supporting disc 34. Power-transmission elements 36, 37 act upon the prestressed disc clutches 40,41 via annular pistons 38, 39. The annular pistons 38, 39 are provided with cam surfaces K1, K2 on the sine facing the supporting disc 34.

Figure 4A:
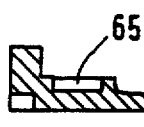
Figure 4:
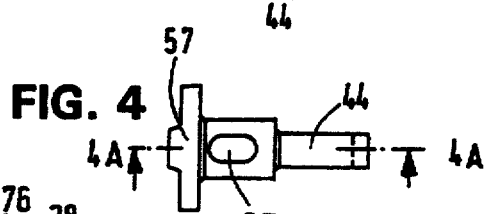
Figure 5:
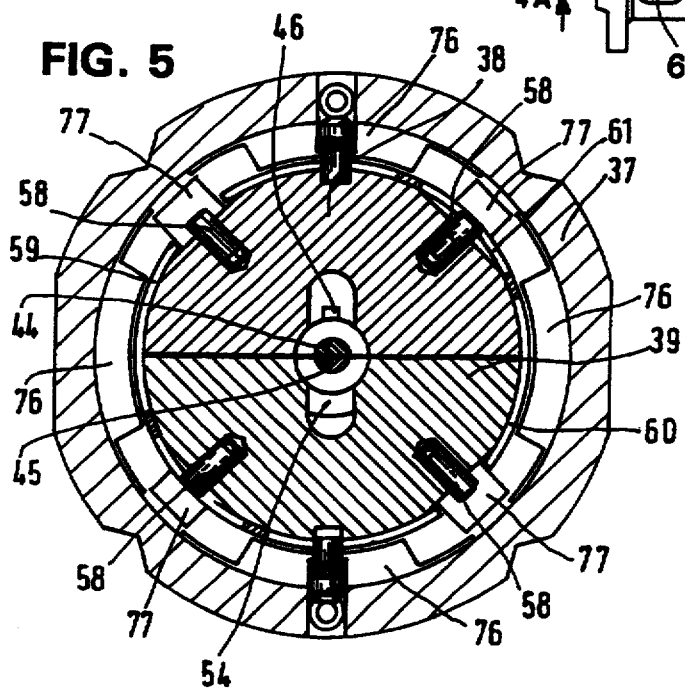

FIG. 4, 4A, 5 show elements of an active shiftable device for limiting the torsion of the annular pistons 38, 39 when the steering angle is large. Locking elements 44, 45 contain, in grooves 65, fitting keys 46, 47 which axially movably and non-torsionally are passed in the grooves 48, 49 of the supporting disc 34. The locking elements 44, 45 abut against discs 50, 51 in the output shafts 13, 14. The discs 50, 51 are pressed by compression springs 52, 53, against guard rings (not shown) in the output shafts 13, 14. The locking elements 44, 45 have helically cut shift teeth 56, 57 which are suited to engage in the grooves 54, 55 of the annular pistons 38, 39.

For reasons of symmetry, the annular pistons 38, 39 each have two opposite grooves 54, 55 so that the annular pistons are replaceable. For operation of the shift teeth 56, 57 only one groove 54 or 55, respectively, would be needed.

The engagement of the shift teeth 56, 57 in the grooves 54, 55 automatically disengages itself when the locking elements 44, 45 are axially power-free.

Radially projecting cylinder pins 58 are inserted on the periphery of the annular pistons 38, 39. Between the periphery of the annular pistons 38, 39 and the housing 32 of the free-wheel clutch 12 there are adjusted metal sheets 59, 60 which almost like half shells comprise the annular pistons 38, 39 and the supporting disc 34.

Disc carriers 76, in which external discs 77 are held with limited torsion, are integral with the housing 32.

Figure 6:
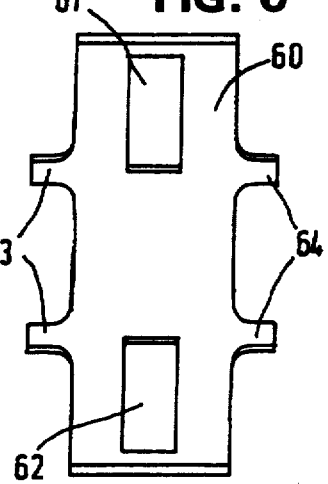

FIG. 6: The metal sheets 59, 60 are the passive device for limiting the torsion of the annular pistons 38, 39 when the steering angle is small and medium. The metal sheets 59, 60 contain central recesses 61, 62 and two stops 63, 64 on each side. The studs 35 of the supporting disc 34 extend through the central recesses 61, 62 into the housing 32 of the free-wheel clutch 12 and center the metal plates 59, 60. The recesses 61, 62 allow rotation of the metal sheets 59, 60 relative to the supporting disc 34. Between both stops 63, 64 on each side of the metal sheets 59, 60, the cylinder pins 58 grip the annular pistons 38, 39. The distance from each other of the lateral stops 63, 64 is somewhat greater than the rotation which the annular pistons 38, 39 can cover relative to the supporting disc 34 until the cams K1, K2, R1, R2 or the power-transmission elements 36, 37 have closed the disc sets 40, 41 and further torsion is blocked.

Mode of Operation:

The speed of the input shaft 4 is transmitted by the shaft 24 to the supporting disc 34 via the pinion 25, the crown gear 28 and the housing 32 of the free-wheel clutches 12.

If the wheels 17, 18 of the axle 5 are neither in a traction nor in a coasting operation, the rollers 36, 37 and annular pistons 38, 39 are power-free (FIG. 3a). The free-wheel clutches 12 (FIG. 1) are disengaged.

Figure 3B:
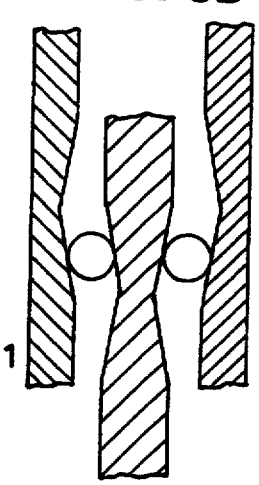

Straight-ahead driving in traction operation:

FIG. 3B: In the stress cycle such as when starting off, the supporting disc 34 moves relative to the power-transmission elements 36, 37 and the annular pistons 38, 39 which remain behind, as result of the slippage effect of the internal discs in relation to the housing 32. The power-transmission elements 36, 37 move along on the ramps R1, R2 and, at the same time, are pressed away from and toward the annular pistons 38, 39 from the central plane of the supporting disc 34. The power-transmission function of the supporting disc 34 on the free-wheel clutches 12 is reinforced by a complementary cam section K1, K2 on the annular piston surfaces facing the power-transmission elements 36, 37. The annular pistons 38, 39 press together the disc sets 40, 41. The wheels 17, 18 are synchronously driven via the output shafts 13, 14. The discs 50, 51 of the output shafts 13, 14 are at the greatest possible distance in an axial direction from the central plane of the supporting disc 34. The locking elements 44, 45—passed by the fitting keys 46, 47 into the grooves 65, 66—rotate with the supporting disc 34 and are free of axial forces from the output shafts 13, 14 so that no engagement in the grooves of the annular pistons 38, 39 occurs.

Figure 3C:
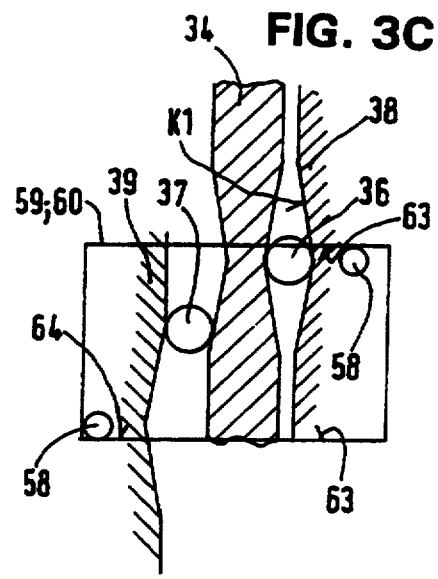

Cornering with small steering angle in traction operation:

FIG. 3C: The turnable-outer wheel 18 covers a wider path than all other wheel 8, 9 and increases speed. The speed increase is further passed along via the output shaft 14 and the disc set 40 thereof to the annular piston 38 of the former. The annular piston 38 rotates away from the position shown on FIG. 3B in a travel direction relative to the supporting disc 34. The cams or profiled surface K1 of the annular piston 38 becomes free from the axial components of the power-transmission element 36. The external discs 77 are held in the housing 32 rotatable by an angle of about 30° so that the internal disc set 40 can release, without tension, the frictional connection between the discs. The turnable-inner wheel 18 rotates free from the supporting disc 34.

The cylinder pins 58 radially projecting on the periphery of the turnable-outer annular piston 38 abut against the stops 63 of the metal sheets 59, 60 in a travel direction.

Since the turnable-inner output shaft 13 remains in a traction operation when the steering angle is small and is driven further by the shaft 4, the cylinder pins 58 of the annular piston 39 hold the metal plates 59, 60 on the stops 64 relative to the supporting disc 34 and the annular piston 38 can rotate with the cylinder pins 58 in the travel direction only by the angle between the stops 63 so that the torsion of the annular piston 38 in the travel direction relative to the supporting disc 34 does not go far enough so that the profile cams R1, K1 again abut against the supporting disc 34 and annular piston 38 for the opposite direction of travel via the power-transmission element 36, and the disc set 40 would again be axially pressurized and engaged. The annular piston 38 remains in a power-free neutral position and the disc set 40 disengaged.

From the steering angle of the wheels 17, 18 results, through the double-crossed joints 15, 16, for both output shafts 13, 14, axial movement toward the supporting disc 34. Since the turnable-inner wheel 17 has a larger steering angle than the turnable-outer wheel 18, the turnable-inner output shaft 13 moves more toward the supporting disc 34 than the turnable-outer output shaft 14. The locking element 45 which is non-torsionally but axially movably passed in the supporting disc 34 is pushed by the turnable-inner output shaft 13 to the turnable-outer annular piston 38. The turnable-outer annular piston 38 has already reached its neutral position in which it is retained in the travel direction by the stops 63 of the metal sheets 59, 60. The piston grooves 54, 55 of the annular piston 38 are aligned in the neutral position with the shift teeth 56 of the locking element 45 so that the displacement of the turnable-inner output shaft 13 can produce engagement of the shift teeth 56 of the locking element 45 in the groove 54 or 55 in the presence of a steering angle of 20°, for instance, and the annular piston 38 is non-torsionally connected with the supporting disc 34.

The turnable-outer output shaft 14 has comparatively moved less toward the supporting disc 34 and the locking element 44 is easily pressed against the turnable-inner annular piston 39 via the spring-prestressed disc 50. Since the turnable-inner annular piston 39 is still in its traction position, the piston grooves 54, 55 and the shift teeth 57 of the locking element are not aligned and the engagement of the shift teeth 57 takes place.

Cornering with large steering angle in the traction operation:

If the steering angle of the turnable-inner wheel 17 of the front axle exceeds a certain limiting angle, which depends on the geometry of the chassis of the motor vehicle and generally amounts to about 35°, the turnable-inner wheel 17 also covers a wider path than the center of the bevel wheel differential 7 of the rear axle 6 and in the presence of adequate ratio front/rear axle of 1:1, for instance, the wheel 17 rotates quicker than predetermined by the drive 4. The increase in speed is transmitted via the output shaft 13 and the disc set 41, and the profiled surface K2 of the annular piston 39 for the turnable-inner free-wheel clutch 12 releases itself from the power-transmission element 37 and the annular piston 39 rotates relative to the supporting disc 34 likewise in the direction of travel. The cylinder pins 58 of the annular piston 39 of the turnable-inner wheel 17 release themselves from the stops 64 of the metal sheets 59, 60 which can rotate together with the cylinder pins 58 in the travel direction.

The locking element 44 is pressed by the turnable-outer output shaft 14 toward the annular piston 39.

If the annular piston 39, when rotating relative to the supporting disc 34, reaches the neutral position, the shift teeth 57 of the locking element 44 overlaps with the grooves 54, 55 of the turnable-inner annular piston 39 and the locking element 44, prestressed by the spring 52 of the turnable-outer output shaft 14, engages by its shift teeth 57 in the groove 54 or 55 of the piston 39 and retains it in neutral position in which the power-transmission elements 37 can transmit no axial forces from the supporting disc 34 to the annular piston 39 and the disc set 41 and thus the turnable-inner wheel 17 also remains separated from the input shaft 4.

The limitation of the torsion of the annular pistons 38, 39 has thus been transmitted from the passive device—half shells 59, 60—to the active device—locking elements 44, 45—shiftable by the output shafts 13, 14.

The position of the annular pistons 38, 39 relative to the supporting disc 34 then corresponds to that of FIG. 3A.

Cornering with diminishing steering angle in traction operation:

The shift teeth 57 belonging to the locking element 44 and pressurized by the turnable-outer double-crossed joint 16 via the output shaft 14 undergoes, as a result of a small steering angle of the turnable-outer wheel 18, less axial displacement to the turnable-inner annular piston 39 than the shift teeth 56 belonging to the locking element 45 and pressurized by the turnable-inner output shaft 13. If the steering angle is reset, the shift teeth 57 belonging to the locking element 44 and pressurized by the turnable-outer output shaft 14 releases first the annular piston 39 with the turnable-inner wheel 17 so that the disc clutch 41 first can engage again and the turnable-inner wheel 17 is first connected again with the input shaft 4 for the traction operation with small steering angles.

Coasting operation in straight-ahead travel:

Both annular pistons 38, 39 are, relative to the supporting disc 34, in the angular position corresponding to the traction operation for the opposite direction of travel.

Coasting operation when cornering:

The turnable-outer wheel 18 drives the supporting disc 34 via the appertaining output shaft 14 and the free-wheel clutches 12. The turnable-outer annular piston 39 cannot be released from the supporting disc 34. The turnable-inner wheel 17 rotates slower and the appertaining annular piston 39 rotates relative to the supporting disc 34 contrary to the direction of rotation until reaching the power-free neutral position in which the turnable-inner annular piston 39 is held by the stops 64 of the metal sheets 59, 60. Independently of the steering angle, the turnable-outer wheel 18 remains in a coasting operation and the turnable-inner wheel in a power-free neutral position.

Disconnection of the axle drive:

A mechanical power-transmission device is provided for the manual control of the free-wheel clutches 12 which is comprised of a lever extending outside the axle housing 21, a rotatable stud 68 with eccentric cams 69 and a stop 70 movable in the housing 32 of the free-wheel clutches 12. The stop 70 acts against springs 72 on engaging elements 73 which can engage in grooves 74 on the periphery of the annular pistons 38, 39 and retain the latter in a power-free neutral position so that the free-wheel clutches 12 remain disengaged. The manual control can take place while the free-wheel clutches 12 are under stress. During the stress cycle the free-wheel clutches change over automatically.

We claim:

1. A driven, rigid and steered axle having first and second output shafts (13, 14) being coaxially supported by an axle housing (21, 22); each of said first and second output shafts (13, 14) having one end thereof driving a wheel (17, 18), via a double-crossed joint (15, 16), and an opposite end thereof being rotatable with but axially movably relative to a pair of internal disc carriers (42, 43), each of said pair of internal disc carriers (42, 43) supporting a plurality of internal discs positioned to engage with a plurality of external discs being supported by a mating pair of external disc carriers, said pair of external disc carriers being operatively connected with an input shaft (4) via a rotatable housing (32) to provide driving power to the wheels; said pair of internal disc carriers (42, 43), said pair of external disc carriers and said internal and external discs forming a pair of disc sets (40, 41); an expansion device (34, 38, 39), having a supporting element (34) firmly connected with said housing (32), being positioned between said pair of disc sets (40, 41); an annular piston (38 or 39) being positioned between said support element (34) and each of said pair of disc sets (40, 41); a first set of ramps (R1, R2) being provided on said supporting element (34) and extending in a direction of rotation, said first set of ramps (R1, R2) co-acting with a second set of ramps (K1, K2) provided on said annular pistons (38, 39); and a device (60) for allowing only limited torsion between said annular pistons (38, 39);

wherein each of said first and second output shafts (13, 14) actuates, by virtue of longitudinal displacement of the output shaft due to a desired steering angle, a snap-in catch which, starting at a desired steering angle, maintains said expansion device in a neutral position; and said snap-in catch comprises two locking elements (44, 45) which are rotate with but are axially movable with respect to said supporting element (34), each of said two locking elements (44, 45) respectively co-acts with one of said annular pistons (38 or 39) via shift teeth (56 or 57) carried by said locking element, and each of said two locking elements (44, 45) is respectively actuated by one of said first and second output shafts (13 or 14).

2. The driven, rigid and steered axle according to claim 1, wherein each of said first and second output shafts (13, 14) actuates said locking element (44, 45) via a spring element (52, 53).

3. The driven, rigid and steered axle according to claim 1, wherein said supporting element (34) comprises a supporting disc and having rolling bodies (36, 37) situated between said first set of ramps on said supporting element (34) and said second set of ramps on said annular pistons (38, 39).

4. The driven, rigid and steered axle according to claim 1, wherein said shift teeth (56, 57), of said locking elements, (44, 45), and mating grooves (54, 55), formed in each of said of annular pistons (38, 39), are helical in shape.

5. The driven, rigid and steered axle according to claim 1, wherein said expansion device is connected to a shifting device actuatable from an exterior of said driven, rigid and steered axle and, when said shifting device is actuated, said expansion device is maintained in a neutral position by said shifting device.

* * * * *